US005926953A

United States Patent [19]

Behar

[11] Patent Number: 5,926,953

[45] Date of Patent: Jul. 27, 1999

[54] METHOD OF MAKING A PUMP DISPENSER USING A CONTAINER WITH A FLEXIBLE BAG

[75] Inventor: Alain Behar, Eu, France

[73] Assignee: Sofab, Le Treport, France

[21] Appl. No.: 09/084,209

[22] Filed: May 26, 1998

Related U.S. Application Data

[62] Division of application No. 08/564,189, Dec. 7, 1995, Pat. No. 5,769,274.

[30] Foreign Application Priority Data

Apr. 8, 1994 [FR] France .................................. 94 04181

[51] Int. Cl.[6] ..................................................... B23P 15/00

[52] U.S. Cl. ........................................... 29/888.02; 29/428

[58] Field of Search ................................ 29/888.02, 428; 222/95, 105, 321.9, 321.1, 321.7

[56] References Cited

U.S. PATENT DOCUMENTS 5,156,299 10/1992 DeCaluwe et al. .
5,474,212 12/1995 Ichikawa et al. .

FOREIGN PATENT DOCUMENTS 2 685 285 6/1993 France .
2 695 111 3/1994 France .
2 155 117 9/1985 United Kingdom .

*Primary Examiner*—I Cuda
*Attorney, Agent, or Firm*—Bacon & Thomas, PLLC

[57] ABSTRACT

A method of making a pump dispenser using a container with a flexible bag for dispensing semi-liquid or creamy substances includes using a flexible bag within an outer rigid container, a bushing fitting in the mouth of the container and a flexible bag secured to the lower part of the bushing in sealing relationship therewith. A pump dispenser is partially fitted in the bushing and the assembly of rigid container, bushing, flexible bag and dispenser are subjected to a vacuum to purge the bag of gas. Subsequently, the pump dispenser is sealingly fit to the bushing except for a venting opening in the bushing that is used to fill the space between the bag and the rigid container with preferably inert gas inserted through the pump dispenser. The pump dispenser is subsequently sealed to the mouth area of the rigid container.

5 Claims, 4 Drawing Sheets

METHOD OF MAKING A PUMP DISPENSER USING A CONTAINER WITH A FLEXIBLE BAG

CROSS REFERENCE TO RELATED APPLICATION(S)

This application is a divisional of non-Provisional U.S. patent application Ser. No. 08/564,189 filed Dec. 7, 1995, now U.S. Pat. No. 5,769,274.

BACKGROUND OF THE INVENTION

1. Field of the Invention

The present invention relates to packaging substances, including both liquids and substances that are at least semi-liquid or creamy, in a dispenser that possesses a rigid case having an internal flexible bag and fitted with a dispenser member enabling its contents to be expelled in successive measured quantities.

2. Related Technology

Commonly, an outer casing serves as a receptacle and is closed by a dispenser member. The dispenser member comprises a mechanism enclosed in a tubular body having a bottom inlet. The mechanism is controlled by pressing down a hollow rod which projects upwards and that serves as an outlet duct or nozzle. The rod is upwardly biased by a return spring. The dispenser member may be a valve, in which case the substance is expelled by pressure from a propellant gas inserted on initial packaging. Alternatively, the dispenser member may be a pump having an axial piston driven by the nozzle for extracting the desired quantity of substance via suction established by the piston rising in its chamber and then for expelling said quantity to the outside via the force of the descending piston. To bring the pressure inside the receptacle back into equilibrium, the pump possesses a vent which is closed by the piston while in its rest position but is open and allows a limited quantity of air to enter during each use.

However, with such devices, the substance is often not contained directly in the rigid outer casing, but in a flexible bag housed therein. The flexible bag possesses an opening which is connected to the dispenser member, the outer casing merely constituting an outer cover. This disposition serves in particular to protect the quality of the substance during long-duration storage. In particular, when the dispenser member is a pump, it enables the substance to be conserved while it is protected from the air. It also makes it possible to prevent volatile substances from evaporating.

In the most convenient of known structures, the dispenser member and the flexible bag are connected together by a ring-forming bushing which possesses a cylindrical skirt attached to an upper band. The opening of the bag is fixed in a sealed manner to the skirt. At least a portion of the tubular body of the dispenser member penetrates through the band and is in turn secured thereto in a sealed manner.

The bushing advantageously possesses a flange attached to the band for centering and support purposes. After the bag has been inserted in the outer cover, the flange allows the bag to be held in the opening of the cover to allow the substance to be injected therein. Thereafter the dispenser member, a pump in the present case, is installed. The dispenser member can be fixed to the bushing and the assembly can be fixed to the opening of the cover using all sorts of members with various connection means such as screws, two regions of leak-proof mutual engagement, etc.

Finally, even when a pump is used, the dispenser member has no vent. However, to allow the bag to collapse progressively as substance is extracted therefrom by the pump without giving rise to suction in the space left empty between the bag and the cover, this space is connected to the atmosphere via a balancing channel, orifice, or path through the cover or beneath the bushing.

OBJECTS AND SUMMARY OF THE INVENTION

The invention relates to an improvement of such flexible bag dispensers that are fitted with a metering pump. It is based on the observation that conservation of the substance can be further improved therein since the presence of permanent communication between the intermediate space and the atmosphere causes the substance to age, given that the bag is not absolutely impervious.

The invention therefore provides a dispenser for a substance that is at least partially fluid, the dispenser possessing an outer casing provided with:

- a pump having a tubular body controlled by acting on a piston having an axial nozzle;
- a flexible bag sheltered inside the casing, connected to the pump by a bushing which forms a ring having a cylindrical skirt connected to a band, an outlet of the bag being fixed in a sealed manner to the skirt, a portion of the tubular body penetrating into the band and fitting thereagainst in a sealed manner, the bushing also having a larger flange for centering and support purposes against the casing; and
- members for fastening the pump to the casing;
- wherein the pump is provided with a vent that is closed by the piston at rest; the bushing is connected thereto beneath the vent, above which there is a counter-flange holding the pump to the casing in a sealed manner; and communication is provided between a lower intermediate space surrounding the bag and an upper intermediate space in communication with the vent.

According to an advantageous characteristic, the band for fitting the bushing in a sealed manner to the bottom portion of the tubular body is in the form of a collar of smaller diameter and the bottom portion of the tubular body fits in a sealed manner merely as a friction fit against a cylindrical inside bearing surface of the band.

The counter-flange is an integral part of a closing collar of the tubular body. The support flange has a cylindrical inside face carrying ribs centering the pump in an initial installation position.

Also, the intake of the pump is directly at the bottom end thereof. The bushing forms therebeneath an inlet grid having, in addition to a lateral intake orifice, a central orifice that supports a tube or a drain.

In addition, according to another characteristic, the coupling ring of the bushing includes a safety valve that prevents flow passing from the inside toward the outside. The safety valve comprises two elementary parts that are nested together in a sealed manner.

Furthermore, the rim of the inner part comprises a chamfered seat for the valve. The valve member comprises a pellet which is connected at the periphery of its conical bearing surface to the outer part via an elastically deformable perforated ring and which is provided with a pusher that leaves channels for passing the substance when making contact with the pump.

Preferably, a peripheral zone surrounding the pump and the bag, which is in communication with the vent, is filled with an inert gas.

The invention also provides a method of packaging a dispenser of the above-mentioned type, characterized in that after the bushing has been put into place and the bag has been filled, the pump is placed at the inlet of the bushing. The assembly is placed in a vacuum so as to purge the bag. The pump is pushed as a friction fit into the band for fitting it in a sealed manner to the bushing. A gas is caused to penetrate into the peripheral zone surrounding the pump and the bag. Finally the pump is sealed to the cover.

According to the invention, the pump is a model that has a vent and the bushing is connected in a leak-proof manner beneath the vent. In contrast, above the vent a counterflange connects the tubular body of the pump in a sealed manner to the outer cover, thereby creating a second intermediate space in association with the vent above the bushing and around the tubular body. An open passage puts the two intermediate spaces into communication between an inside front face and an outside rear face of the bushing, thereby recreating a single peripheral zone. This zone is thus connected to the atmosphere via the vent of the pump only temporarily each time the pump is used. This suffices to balance the bottom intermediate space around the bag by passing air via the top space, while reducing to nothing the gas exchanges that could otherwise arise through the bag between the substance inside the bag and the atmosphere. In addition, for commercialization purposes, it becomes possible to fill the peripheral zone with an inert gas such as nitrogen, thereby protecting the substance better still over a long period until it is put into operation by the client user.

BRIEF DESCRIPTION OF THE DRAWINGS

The invention will be better understood and various characteristics will be explained on reading the following description of advantageous embodiments accompanied by the drawings wherein.

DETAILED DESCRIPTION

The dispenser shown in the figures comprises an outer casing 1 whose opening, assumed to be circular in this case, receives a bushing 2 that is essentially made up of two concentric rings. The first constitutes a sealed connection ring, comprising a ferrule whose top portion forms a band 2*a* and which is extended downwards by a skirt 2*b*. The skirt supports a flexible bag 3 that is to contain a substance P. The opening of the bag is placed around the skirt and is fixed in a sealed manner to an outside face thereof. The second ring comprises a cylindrical ferrule 2*c* that is of larger diameter than skirt 2*b*. The cylindrical ferrule 2*c* is attached at a bottom end to a top edge of band 2*a* via a projection 2*d*. Ferrule 2*c* is provided at its own top end with a flange 2*e*. By centering in and resting on an outlet of outer casing 1, flange 2*e* serves as a supporting and fastening member. Level with projection 2*d*, bushing 2 has three slots 2*f* passing therethrough which are conventionally obtained by cores penetrating into molds for manufacture by injection molding.

Figure 1A:
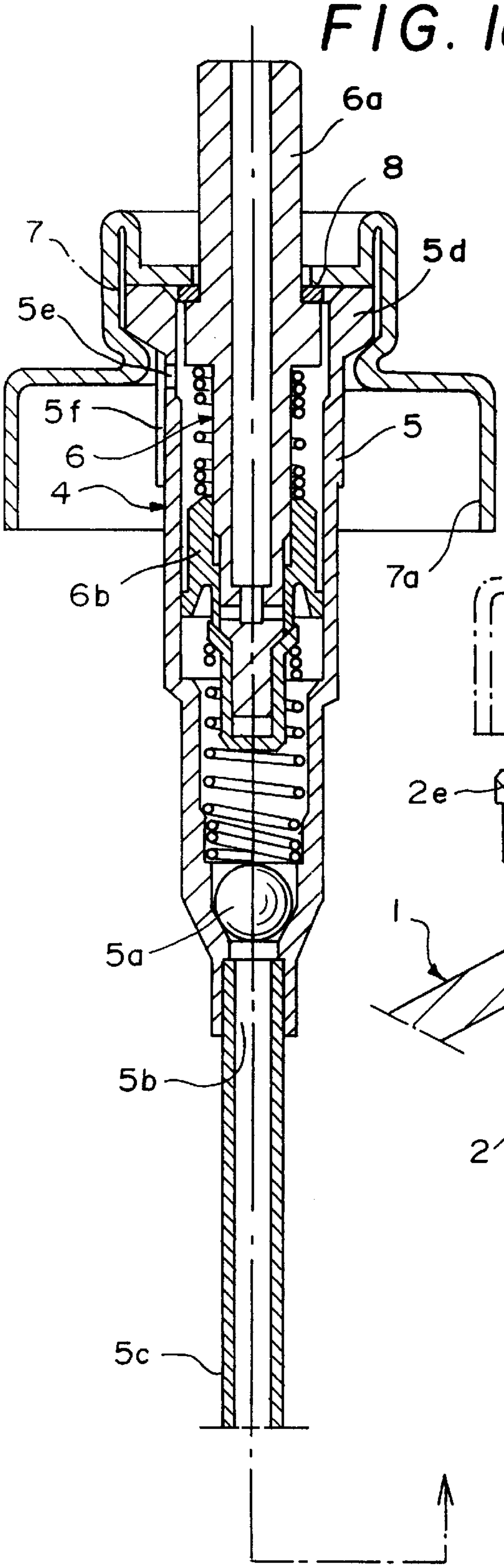
FIGS. 1*a* and 1*b* show in fragmentary longitudinal section a dispenser and an outer casing of the invention, respectively, before being assembled.
Figure 1B:
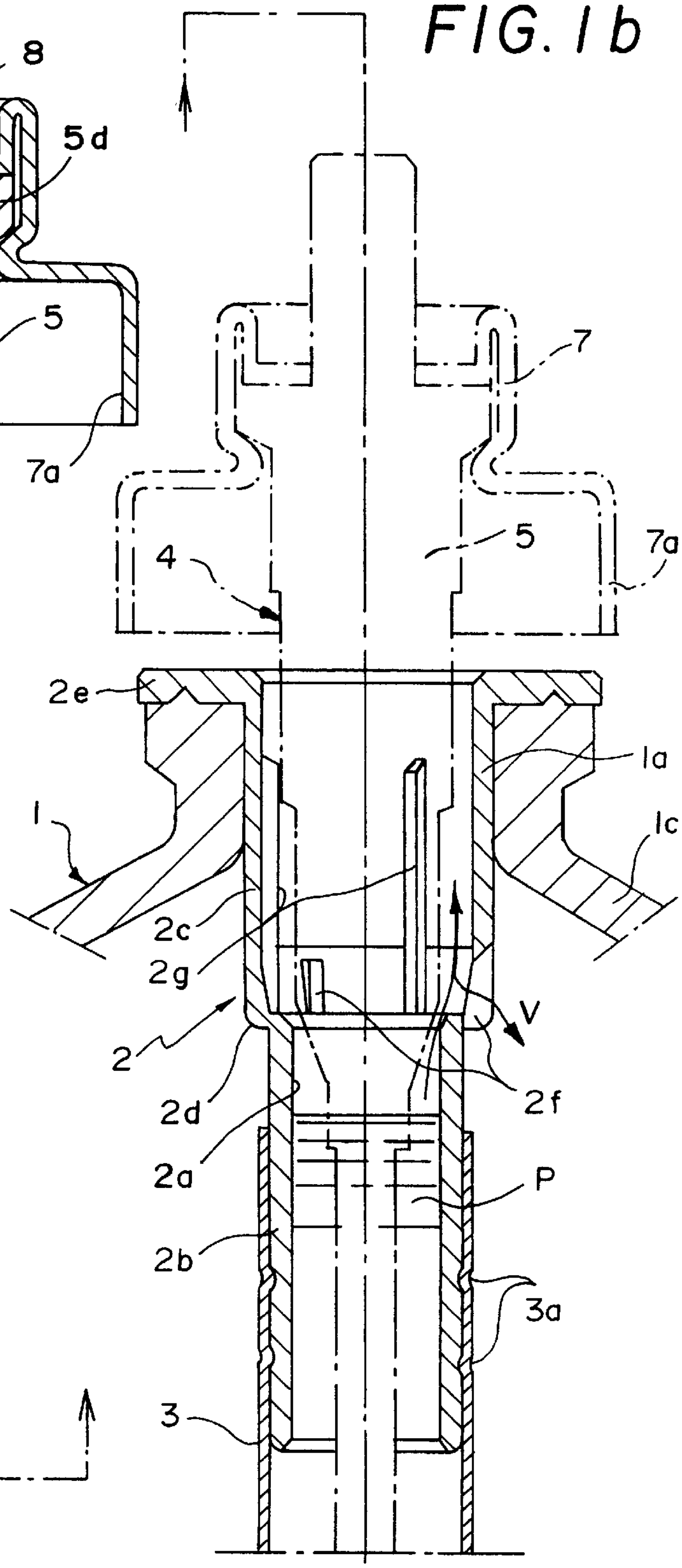
Figure 1C:
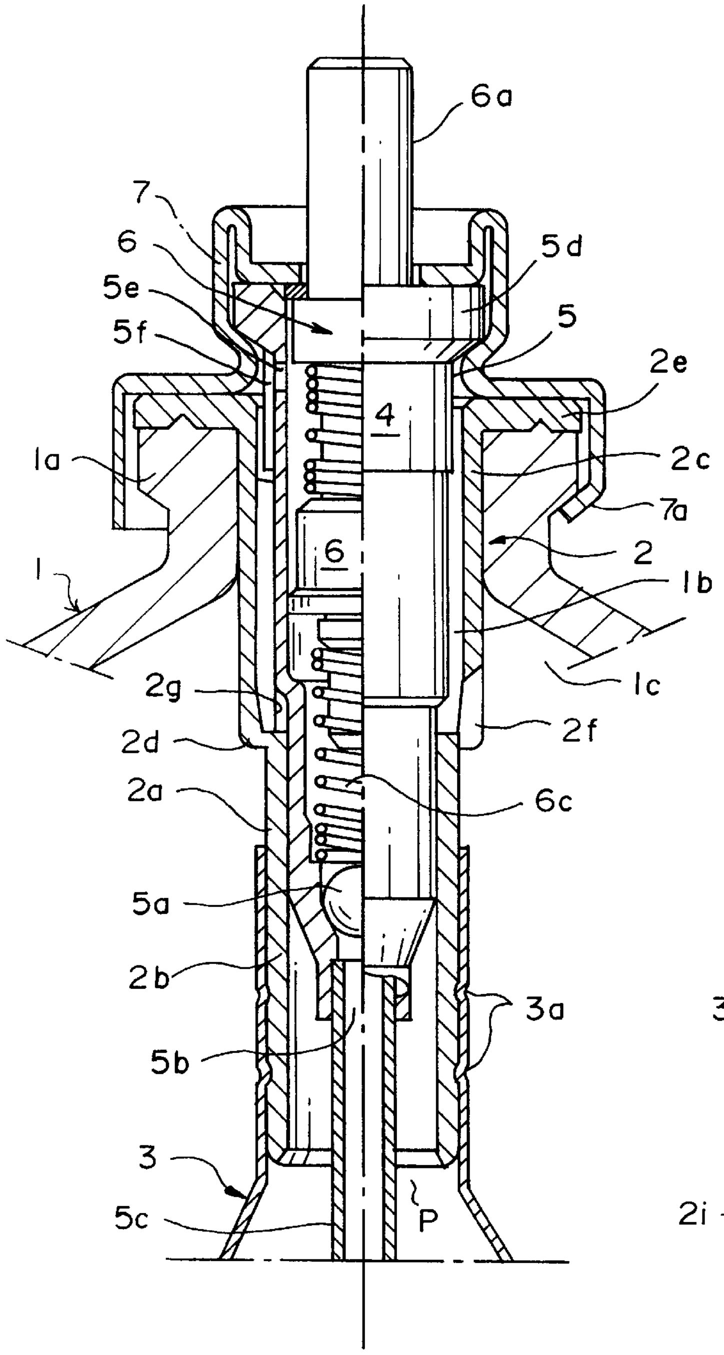
FIG. 1*c* shows the dispenser and outer casing shown in FIGS. 1*a* and 1*b* after being assembled.

Bushing 2 receives a conventional type of dispenser pump 4 which is shown in full section in FIG. 1*a*, in outline in FIG. 1*b* and in partial section in FIG. 1*c*. A tubular body 5 of the pump comprises two successive cylinders of decreasing diameter, and includes a ball inlet valve 5*a* associated with a bottom orifice 5*b* connected to a dip tube 5*c* having a flow conduit through which fluid substance to be pumped flows. A collar 7 crimped to a rim 5*d* of the body retains a piston 6 therein. Piston 6 has a hollow rod passing through the collar to form an axial nozzle 6*a*.

Piston 6 includes a sliding sleeve 6*b* which serves both as a sealing gasket and as an outlet non-return valve. It co-operates with a return spring. At rest, piston 6 is urged upward by a spring 6*c* and provides sealing against collar 7 via a sealing ring 8. However, a vent hole 5*e* passes through a wall of body 5 near the top thereof, above sleeve 6*b*.

In the assembled position, shown in section in FIG. 1*c*, the bottom cylinder of the tubular body fits in a sealed manner on a cylindrical inside bearing surface of band 2*a*, preferably merely by being a tight fit, thereby isolating substance P contained in bag 3 from the outside. The bag is thus advantageously fixed in a sealed manner to skirt 2*b* by adhesive or via two weld lines 3*a* located outside the band-engaging zone of the bottom cylinder of the tubular body so as to avoid deforming the plastics parts in this zone.

Collar 7 expands into a counter-flange 7*a* for crimping against a rim 1*a* of the outer casing, thereby compressing flange 2*e* of the bushing, which thus serves as a sealing gasket. The profiles of the tubular body and of the bushing match. A well is formed by ferrule 2*c* leaving an upper intermediate space 1*b* between the two parts, if necessary by means of a groove 5*f* formed in a thickening of the outside face of the top cylinder of the tubular body and extending to vent 5*e*. The intermediate space is above bushing 2, but below collar 7.

In this way, the outer casing serves only as a protective cover. Lower intermediate space 1*c* left between outer casing 1 and bag 3 is normally closed, but is put temporarily into communication with the atmosphere via slots 2*f*, space 1*b*, and vent 5*e* every time pressure on nozzle 6*a* moves piston 6 away from sealing ring 8. This makes it possible to balance the pressure therein on each occasion the pump is actuated, but without genuinely renewing the air.

As already mentioned above, for packaging purposes, bushing 2 and bag 3 in a collapsed condition are placed in outer casing 1. A filling spout is inserted therein and engages band 2*a*. A substance is then injected, thereby inflating the bag. The spout is then withdrawn. Pump 4 is then installed as shown in chain-dotted lines in FIG. 1*b*. The assembly can then be purged in a vacuum chamber while the peripheral zone or the bag is still in direct communication with said chamber via slots 2*f*, or alternatively the inside of skirt 2*b* via space 1*b*, as shown by double-headed arrow V. To facilitate this operation, ribs 2*g* for centering the pump in a half-way position are preferably provided on an inside face of ferrule 2*c* in alternation with slots 2*f*. The pump is then pushed into band 2*a*, thereby establishing a friction seal and closing the bag. The peripheral zone is filled with air or with a nitrogen atmosphere in such a manner that the pressure in space 1*c* is sufficient to cause the bag to shrink slightly by expelling substance from inside the pump but without raising sleeve 6*b*. Finally, the dispenser is sealed with the pump pressed down as shown in FIG. 1*c*, thus establishing leak-proof fixing of collar 7 on rim 1*a*.

The substance is then completely protected from air, since the peripheral zone is normally further closed by sealing ring 8.

Figure 2:
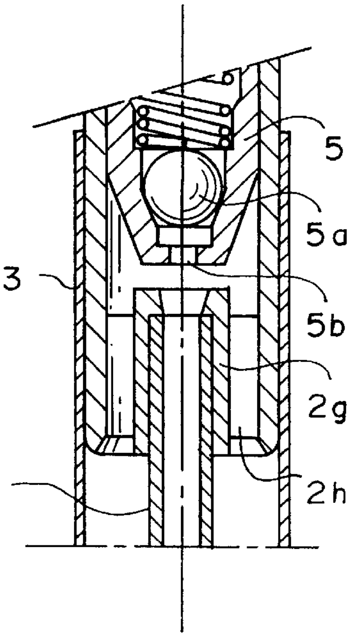
FIG. 2 shows a detail of a multiple-inlet variant of the embodiment shown in FIGS. 1*a* and 1*b* for semi-liquids or creams.

FIG. 2 shows a modification in which the bottom intake of the pump is adapted for receiving semi-liquid substances. The intake is formed directly by orifice 5b at the end of the body, with substance being taken from the top of bag 3. However, beneath the intake, ferrule 2 forms an inlet grid 2h at end of the skirt 2b which carries the bag. Inlet grid 2h possesses, in addition to lateral intake orifices, a central orifice which supports a tube 2i that extends to the bottom of the bag. By forming a drain, this tube suffices to prevent flattening of the bag as use progresses. Such flattening would finally cause a portion of the contents to be trapped in the bag.

Figure 3:
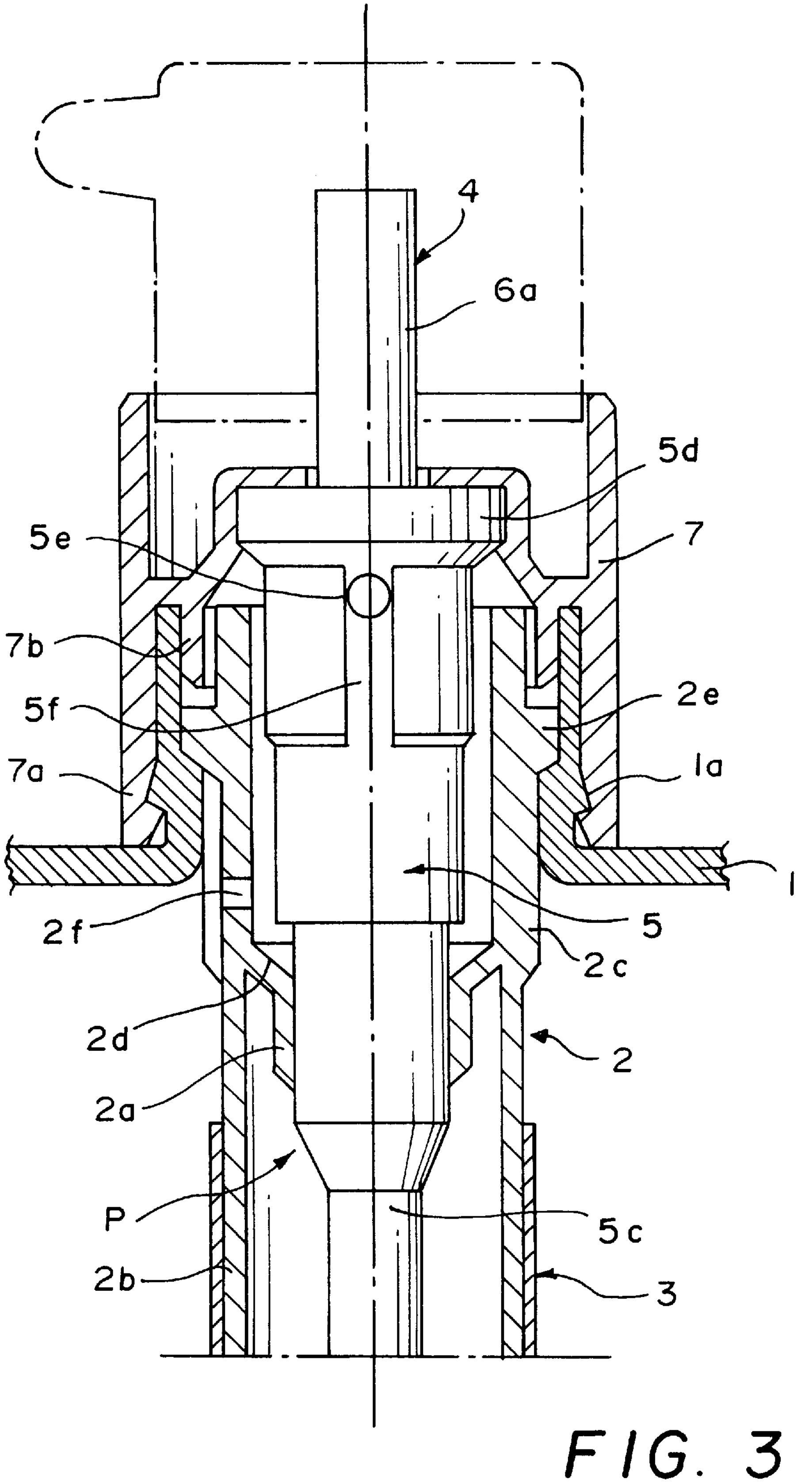
FIG. 3 shows a similar embodiment.

In the embodiment shown in FIG. 3, a head serving as a pushbutton and fitted with an appropriate outlet nozzle is shown in chain-dotted lines. The general structure of the device is similar to that of FIG. 1c and its various parts are given the same references. The main differences result from the fact that the dispenser member is fitted to an outer casing made of synthetic material.

The outlet of bag 3 is of larger diameter. The step between skirt 2b and ferrule 2c is smaller, being reduced in practice to the thickness initially occupied by the folded wall of the bag. In contrast, to enable band 2a to be a friction fit on the diameter of the bottom portion of tubular body 5, band 2a is in the form of a smaller internal collar. Flange 2e does not bear against the rim of outer casing 1, but on a shoulder inside its neck. Collar 7 is of synthetic material and is merely snap-fastened on rim 5d of the tubular body. Collar 7 directly provides sealing against outer casing 1 by means of a lip 7b and also provides counter-flange 7a which is subsequently snapped behind rim 1a of outer casing 1 (which may be annular or otherwise) forming a catch therefor. Flange 2e therefore plays no role in sealing outer casing 1. This structure makes it possible to manufacture all of the parts by injection molding and to assemble them by mutual engagement.

It will be observed that numerous variants are possible. In particular, the counter-flange could be different in appearance, being formed by an independent cap that clamps against both the collar and the outer casing. Communication between the two spaces 1b and 1c of the peripheral zone is formed via a lateral hole 2f. Communication could naturally also be provided, for example, by a groove passing through flange 2e.

Figure 4:
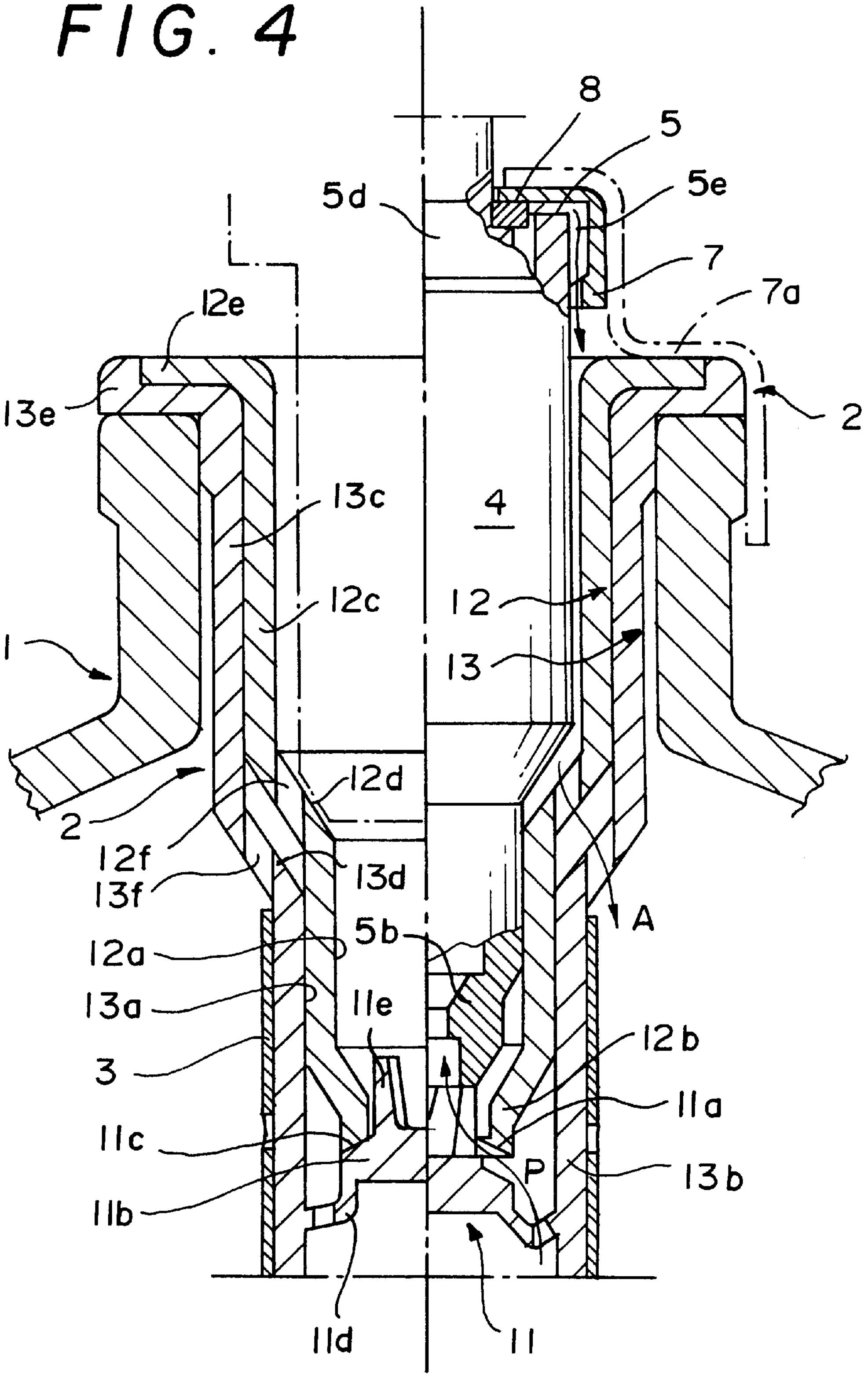
FIG. 4 shows another embodiment of the invention useful for thick substances and including a safety valve.

FIG. 4 shows another embodiment in which the coupling ring of bushing 2 includes a safety valve 11 beneath pump 4 that does not allow communication from the inside to the outside. Safety valve 11 comprises inner and outer parts 12 and 13 nested one in the other. The other parts retain the same references.

In this case, inner part 12 forms a sealing band 12a suitable for fitting to the bottom portion of the tubular body beneath which a bottom rim 12b forms a seat having a chamfered bottom bearing surface 11a for valve 11. It is itself engaged in a sealed manner in outer part 13 around a wall 13a extending to a skirt 13b whose outside face carries flexible bag 3 and whose inside face carries a valve member 11b suitable for co-operating with a seat 11a.

This bottom ring of outer closure plug part 13 connects via a shoulder 13d to a ferrule 13c of a flange 13e for providing centering and support, flange 13e resting on the edge of outer casing 1. In the version shown, band 12a of inner part 12 is itself connected via a shoulder 12d to a ferrule 12c of a similar flange. Ferrule 12c engages in ferrule 13c and in turn rests thereagainst via a flange 12e. The bushing is thus made up of two parts, with two walls that touch one another for the most part separating in the vicinity of shoulders 12d and 13d while being connected together in a sealed manner level with band 12a. The inside shape and the dimensions of the bushing are adapted to centering and supporting pump 4. Within the shoulders, slots 12f and 13f establish communication between vent 5e of the pump and space 1c surrounding bag 3.

Valve member 11b comprises a pellet or plug extending substantially perpendicularly relative to the vertical axis of pump 4. The pellet is connected at the periphery of a conical bearing and sealing surface 11c to skirt 13b via an elastically deformable perforated ring 11d. To have even greater flexibility, this ring is of substantially V-shaped cross-section.

In addition, valve member 11b is provided with a pusher 11e which, on making contact with the pump, leaves space for allowing the substance to pass. Valve member 11b comprises three fingers whose tips are intended to come into contact with the end edge of bottom intake orifice 5b without closing said orifice when pump 4 is in place.

The lefthand portion of FIG. 4 shows valve 11 in its closed position in the absence of a pump, while the righthand portion of the figure shows valve 11 in its open position with the valve member being separated from its seat by said pump being installed in a sealed manner. It may incidentally be observed that in the present case collar 7 is used solely for closing the pump, while counter-flange 7a is formed by a separate part tightly engaged thereon prior to the pump being crimped to outer casing 1. The vent shown comprises a groove formed in the bearing surface of pump flange 5d and extending to sealing ring 8.

Bag 3 is initially mounted on ferrule 2 which is itself engaged on the neck of outer casing 1. In this position bag 3 is filled by means of a substance injection tube P (chain-dotted lines) that bears in a sealed manner against shoulder 12d, the valve being opened by ring 11d deforming under the effect of the pressure and the substance penetrating through the peripheral perforations. After filling, the valve closes, thereby protecting the contents of the bag from air.

Installation of the pump can thus be deferred without harm. When the pump is installed, its bottom end presses against fingers 11e, thereby reopening valve 11 by pushing down valve member 11b. A passage is thus opened for the substance along the path marked by the arrow P. Air entering via vent 5e of the pump can balance pressure during operation by passing through slots 12f and 13f along arrow A.

The use of a pump with a dip tube enabling substance to be taken from the bottom of the bag merely requires force to be applied when installing the pump so as to enable the bevelled end of the tube to remove the valve member by tearing through its ring.

I claim:

1. A method of making a pump dispenser including a flexible bag within an outer rigid container having an inlet and outlet opening, and further wherein a pump dispenser body is concentrically fitted into a bushing supported by the container in the opening, said bushing including a lower band to which the upper end of a flexible bag is sealingly secured within the rigid container, and a venting opening establishing communication between the bushing interior and the rigid container interior outside a bag in the container, comprising the steps of:

placing the bag in collapsed, empty condition in the rigid container through the opening after it has been secured to the lower band of the bushing and locating the bushing in the container opening in sealed relationship in the opening except for the venting opening;

filling the bag through the bushing before the pump dispenser is fitted thereto;

locating the pump partially into the bushing in non-sealed relationship;

placing the assembly of container, bushing, bag and pump dispenser in a vacuum device and purging at least the bag interior of gas;

completely fitting the pump dispenser to the bushing in sealed relationship with the bushing and bag interior while the bag is maintained in purged condition;

injecting a gas into the space between the container and the bag via the pump dispenser and venting opening.

2. The method of claim 1, wherein the step of completely fitting the pump dispenser in the bushing in sealed relationship is carried out by a friction fit between a pump dispenser exterior surface area and a bushing interior surface area.

3. The method of claim 1, wherein the gas injected is an inert gas.

4. The method of claim 1, wherein the gas is pressurized.

5. The method of claim 1, including, after the step of completely fitting the pump dispenser in the bushing, sealing the pump dispenser to the opening of the container.

* * * * *